(12) United States Patent
Yamada et al.

(10) Patent No.: US 6,370,608 B2
(45) Date of Patent: *Apr. 9, 2002

(54) CARD-TYPE PERIPHERAL DEVICE MOUNTING/DEMOUNTING DEVICE AND ELECTRONIC APPARATUS INCORPORATING THE MOUNTING/DEMOUNTING DEVICE

(75) Inventors: Shigemi Yamada, Kanagawa; Tsutomu Asawa, Nagano, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,790

(22) Filed: Oct. 1, 1998

(30) Foreign Application Priority Data

Oct. 3, 1997 (JP) ................................. 9-271048

(51) Int. Cl.[7] ............................................... G06F 13/00
(52) U.S. Cl. ........................................ 710/301; 439/159
(58) Field of Search ................................. 710/102, 103, 710/301, 302; 439/159

(56) References Cited

U.S. PATENT DOCUMENTS

| 4,835,737 A | * | 5/1989 | Herrig et al. | 710/103 |
| 5,310,998 A | * | 5/1994 | Okuno | 710/103 |
| 5,454,080 A | * | 9/1995 | Fasig et al. | 710/103 |
| 5,692,208 A | * | 11/1997 | Felcman et al. | 710/102 |
| 5,730,610 A | * | 3/1998 | Hsia et al. | 439/160 |
| 5,802,328 A | * | 9/1998 | Yoshimura | 710/102 |
| 6,000,958 A | * | 12/1999 | Ishida et al. | 439/159 |

* cited by examiner

*Primary Examiner*—Glenn A. Auve
(74) *Attorney, Agent, or Firm*—Frommer Lawrence & Haug LLP; William S. Frommer; Matthew K. Ryan

(57) ABSTRACT

A mounting/demounting device for mounting and demounting a card-type peripheral device that enhances or adds to functions of a portable computer or the like. The mounting/demounting device has a supporting structure having a slot for receiving the card-type peripheral device, for supporting said card-type peripheral device received through the slot. The mounting/demounting device further has a releasing structure having an operating portion which when operated causes the card-type peripheral device supported in the supporting structure to be ejected out of the supporting structure. The operating portion has a part that is foldable toward the slot of the supporting structure.

5 Claims, 13 Drawing Sheets

CARD-TYPE PERIPHERAL DEVICE MOUNTING/DEMOUNTING DEVICE AND ELECTRONIC APPARATUS INCORPORATING THE MOUNTING/ DEMOUNTING DEVICE

BACKGROUND OF THE INVENTION

1. Field of the Invention

The present invention relates to a mounting/demounting device for mounting and demounting a card-type peripheral device on and from an electronic apparatus for the purpose of enhancing or adding functions of the electronic apparatus. The present invention also is concerned with an electronic apparatus incorporating such a mounting/demounting device.

2. Description of the Related Art

In recent years, various types of portable electronic apparatuses are commercially available, including highly sophisticated apparatuses incorporating central processing units (CPUs). Such portable or mobile electronic apparatuses include, for example, portable computers having a display unit that is hinged to a main body of the computer so as to be swung between an open or operative position and a closed or folded position. Typical examples of the apparatuses of this kind are so-called notebook personal computers.

In the meantime, there is a trend towards reduction in the thickness of the main body of portable computers. As a result, many of the current portable computers are designed such that an accessory, e.g., a PC card, is inserted into the computer main body. For information, the term PC card is used as a general expression of credit-card-sized peripheral devices that follow the PC card standards jointly set up by the PCMCIA of the United States of America and the Japan Electronic Industry Development Association (JEIDA). Thus, the main body of the computer of the kind described has a mounting/demounting device for mounting and demounting a card-type peripheral device that is used for the purpose of enhancing or adding to functions of the computer.

In general, a conventional mounting/demounting device has, as shown in FIG. 15, an operating portion 1000 and a main part 1001. The arrangement is such that a card-type peripheral device 1002 for enhancing or adding to the functions is ejected in the direction of arrow D1 in response to pressing of the operating portion 1000 in the direction of arrow D. When the card-type peripheral device 1002 has been accommodated in the main part 1001, a tab portion 1003 of the operating portion is pivoted away from the main part 1001 and the peripheral device 1002 as indicated by the arrow F. In this state, the tab portion 1003 extends in the direction of arrow E, so as not to interfere with other parts.

Folding of the tab portion 1003 into the direction E undesirably increases the space occupied by the mounting/demounting device, causing an impediment to the reduction in the size of the portable computer.

SUMMARY OF THE INVENTION

Accordingly, an object of the present invention is to provide a card-type peripheral device mounting/demounting device that occupies a smaller space than conventional mounting/demounting device, thereby overcoming the above-described problem.

Another object of the present invention is to provide an electronic apparatus incorporating such a mounting/demounting device.

According to one aspect of the present invention, there is provided a mounting/demounting device for mounting and demounting a card-type peripheral device that enhances or adds to functions, comprising: a supporting structure having a slot for receiving the card-type peripheral device, for supporting the card-type peripheral device received through the slot; and releasing means having an operating portion which when operated causes the card-type peripheral device supported in the supporting structure to be ejected out of the supporting structure, the operating portion having a part that is foldable toward the slot of the supporting structure.

The supporting structure has a slot for receiving the card-type peripheral device, and supports the card-type peripheral device received through the slot. The releasing means has an operating portion which when operated causes the card-type peripheral device supported in the supporting structure to be ejected out of the supporting structure. The operating portion has a part that is foldable toward the slot of the supporting structure.

This part of the operating portion is not folded to extend outward from the supporting structure. It is therefore possible to reduce the space occupied by the mounting/demounting device.

Preferably, the operating portion has a base and a pivotable member pivotably connected to the base, the pivotable member being foldable towards the slot to a position where the pivotable member lies aside and below the slot. The card-type peripheral device, therefore, is not interfered with the pivotable member when inserted into the slot.

According to another aspect of the present invention, there is provided an electronic apparatus having mounting/demounting device for a card-type peripheral device having the features stated above.

These and other objects, features and advantages of the invention will become clear from the following description of a preferred embodiment taken in conjunction with the accompanying drawings.

DESCRIPTION OF THE PREFERRED EMBODIMENT

A detailed description will be given of a preferred embodiment of the present invention, with reference to the accompanying drawings.

It is to be noted, however, the following description of the preferred embodiment is for an illustrating purpose only, and various technical limitations appearing in the description of the preferred embodiment are not intended to limit the scope of the invention unless otherwise specified.

Figure 1:
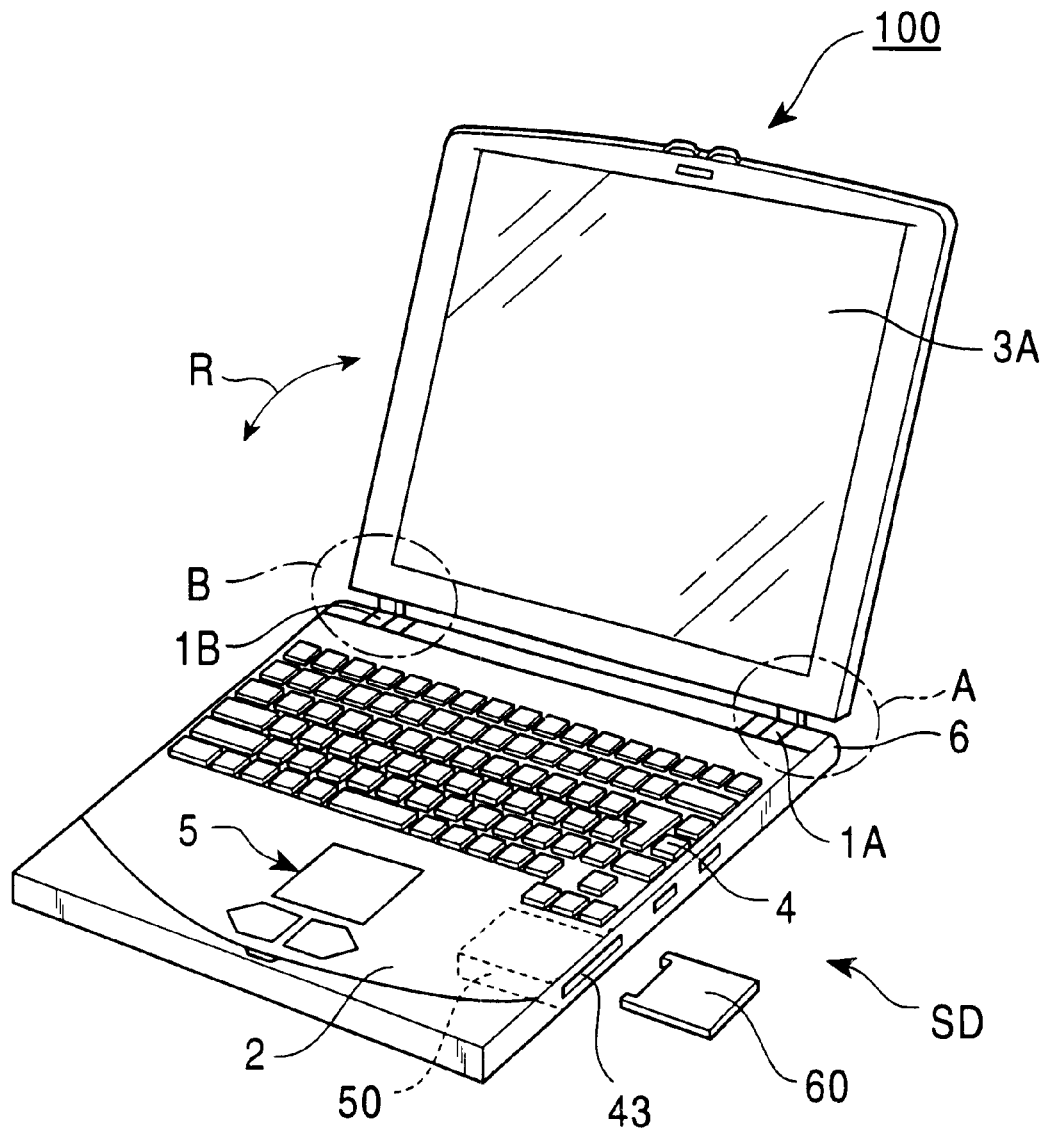
FIG. 1 is a perspective view of a portable computer incorporating a card-type peripheral device mounting/demounting device in accordance with the present invention.

Referring to FIG. 1, a portable computer 100, as an example of the electronic apparatus, is equipped with a mounting/demounting device of the invention for mounting and demounting a card-type peripheral device on and from the computer 100. More particularly, the portable computer 100 has a main unit 2, a display unit 3, a keyboard 4, hinges 1A, 1B demarcated by chain-line circles A and B, and so forth.

The main unit 2 carries components such as a pointing device 5, besides the above-mentioned keyboard 4. The display unit 3, which may be a liquid crystal display device (LCD), is secured to the main unit 2 by means of the hinges 1A and 1B, so as to be swung in the directions of the double-headed arrow R, between an open operative position as illustrated and a closed position in which the display unit 3 is folded to be laid on the main unit 2. The main unit 2 may be provided with an adapter or the like to enable an external pointing device such as a mouse to be connected to the main unit 2, although such an adapter is omitted from FIG. 1.

Figure 2:
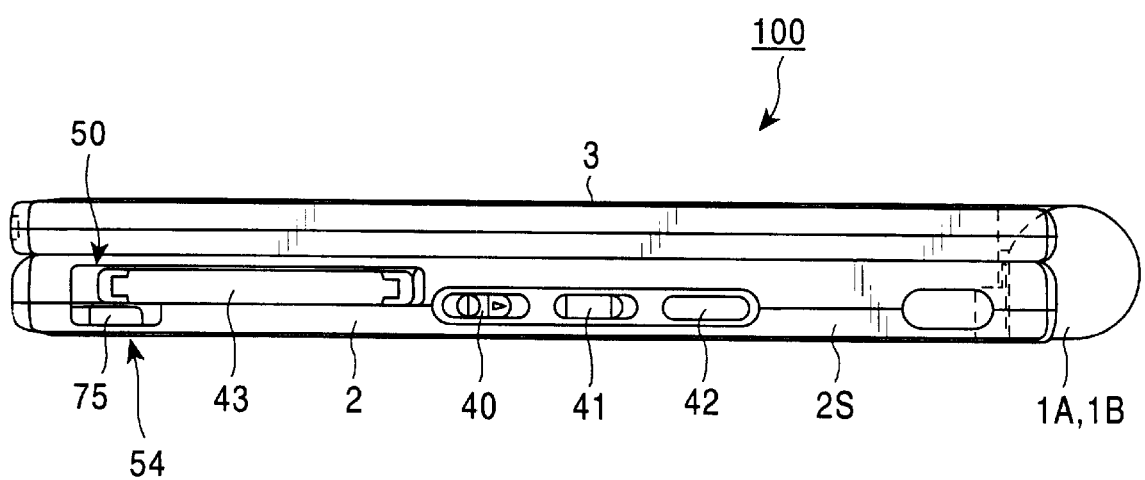
FIG. 2 is a side elevational view of the portable computer shown in FIG. 1 in a folded state.

FIG. 2 is a side view of the portable computer 100 with the display unit 3 folded to lie on the main unit 2, as viewed in the direction of arrow SD. As will be seen from this Figure, a power supply switch 40, other switches 41, 42, and so forth are arranged on one side surface 2S of the main unit 2. A main unit slot 43 for receiving an electronic card (PC card) 60 is formed in one side surface 2S of the main unit 2.

Figure 3:
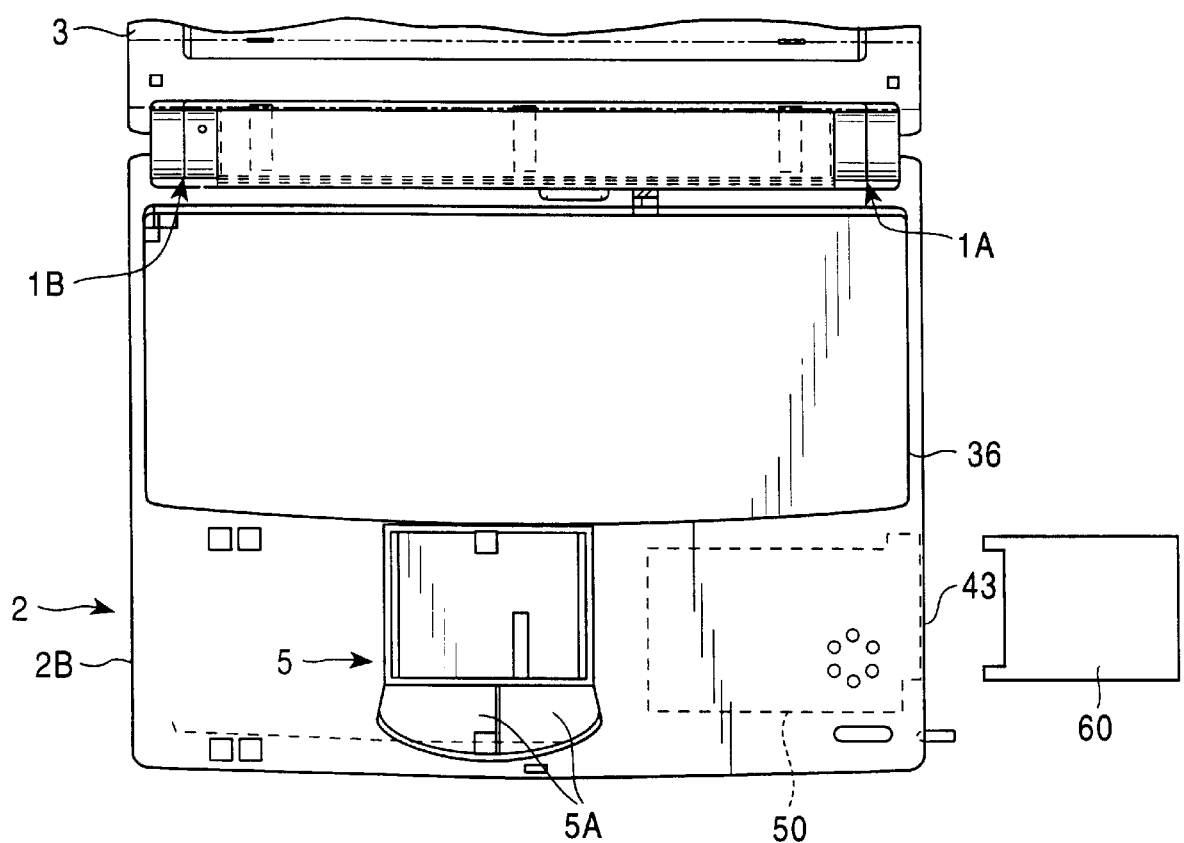
FIG. 3 is a plan view of the main unit of the portable computer shown in FIG. 1.

The main unit slot 43 is positioned in alignment with a mounting/demounting device 50 of the invention for mounting and demounting a card-type peripheral device which is typically the above-mentioned PC card 60 having, for example, a size corresponding to that of credit cards. FIG. 3 shows the main unit 2 of the portable computer 100 together with the card-type peripheral device mounting/demounting device 10 and the PC card 60.

Figure 4:
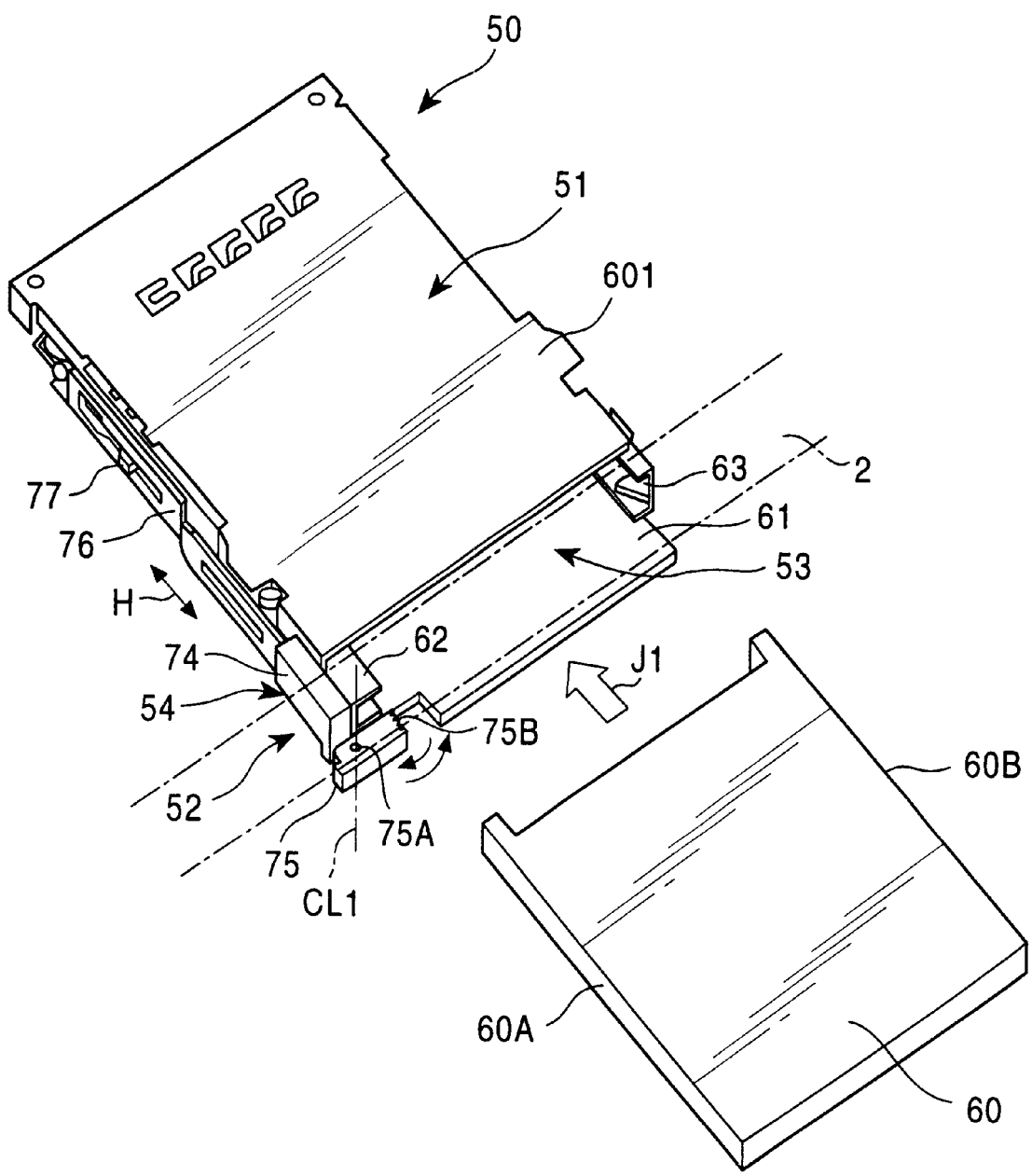
FIG. 4 is a perspective view of a card-type peripheral device mounting/demounting device, showing also a PC card by way of example.
Figure 5:
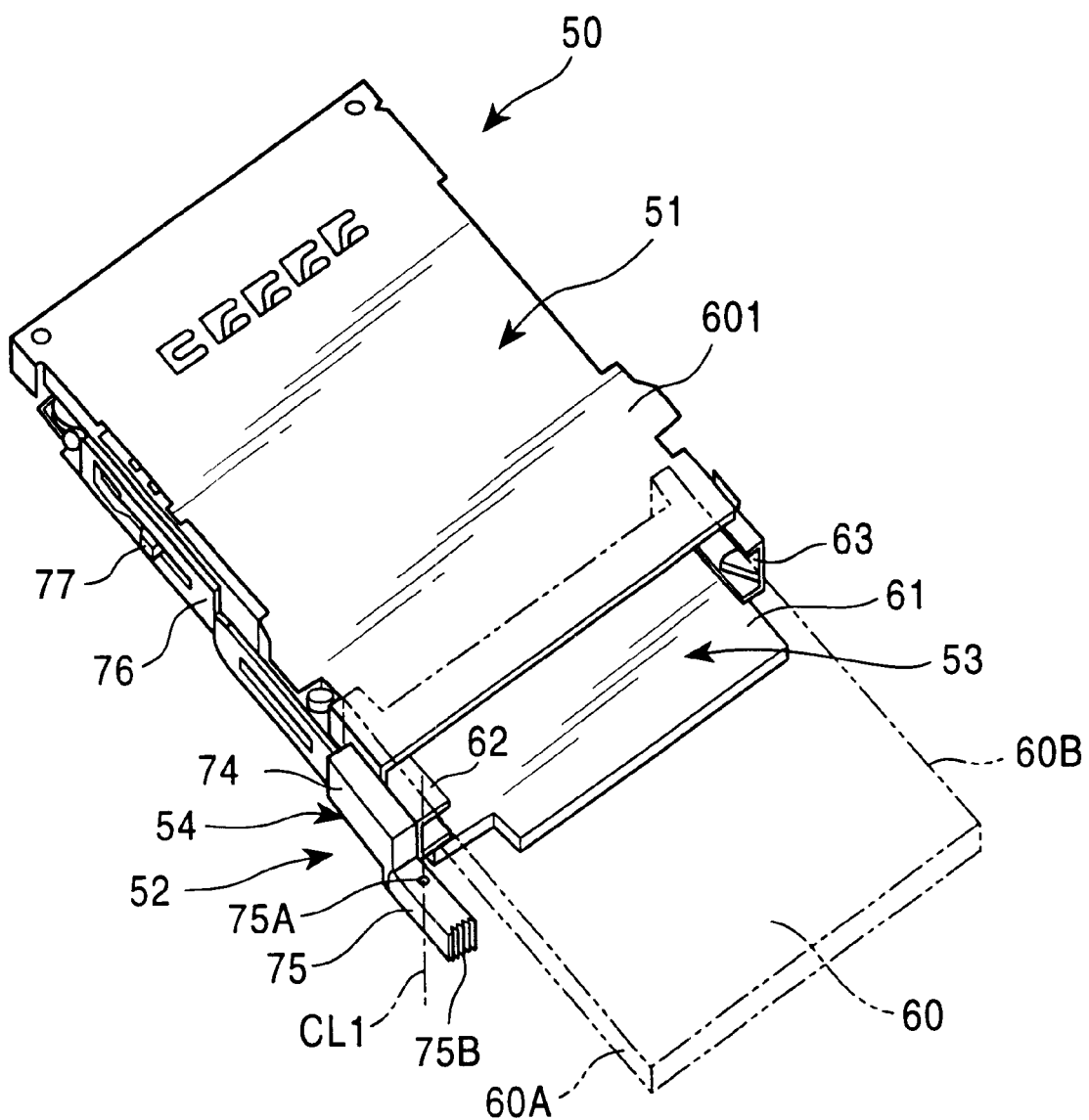
FIG. 5 is an illustration of the card just going to be inserted into the mounting/demounting device.
Figure 6:
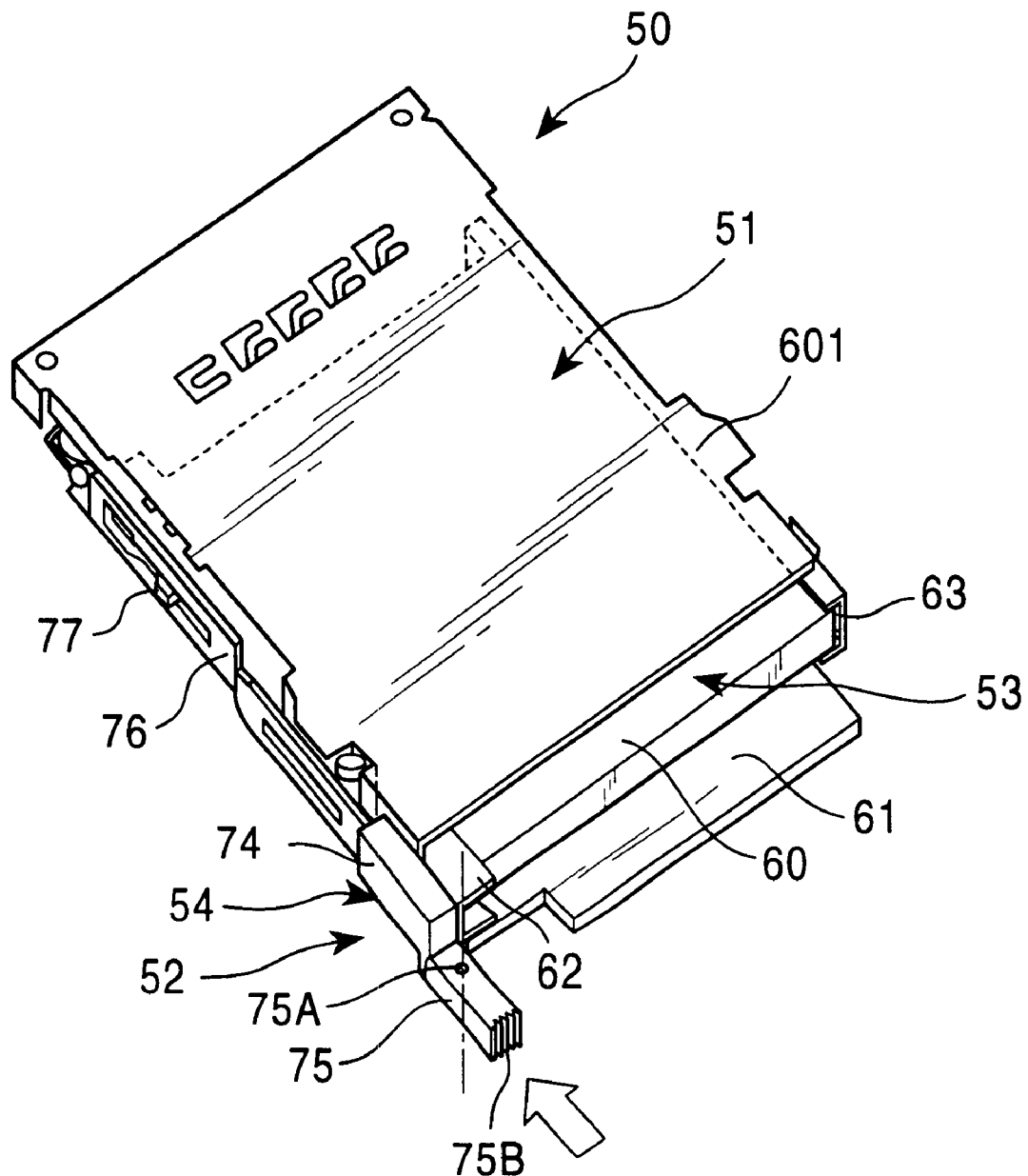
FIG. 6 is an illustration of the card that has been received in the mounting/demounting device.

FIG. 4 shows the card-type peripheral device mounting/demounting device 50 and the card 60 that is just going to be inserted into the mounting/demounting device 50. FIG. 5 shows the card 60 on its way into the mounting/demounting device 50, while FIG. 6 shows the card 60 that has been set in the mounting/demounting device 50.

Figure 7:
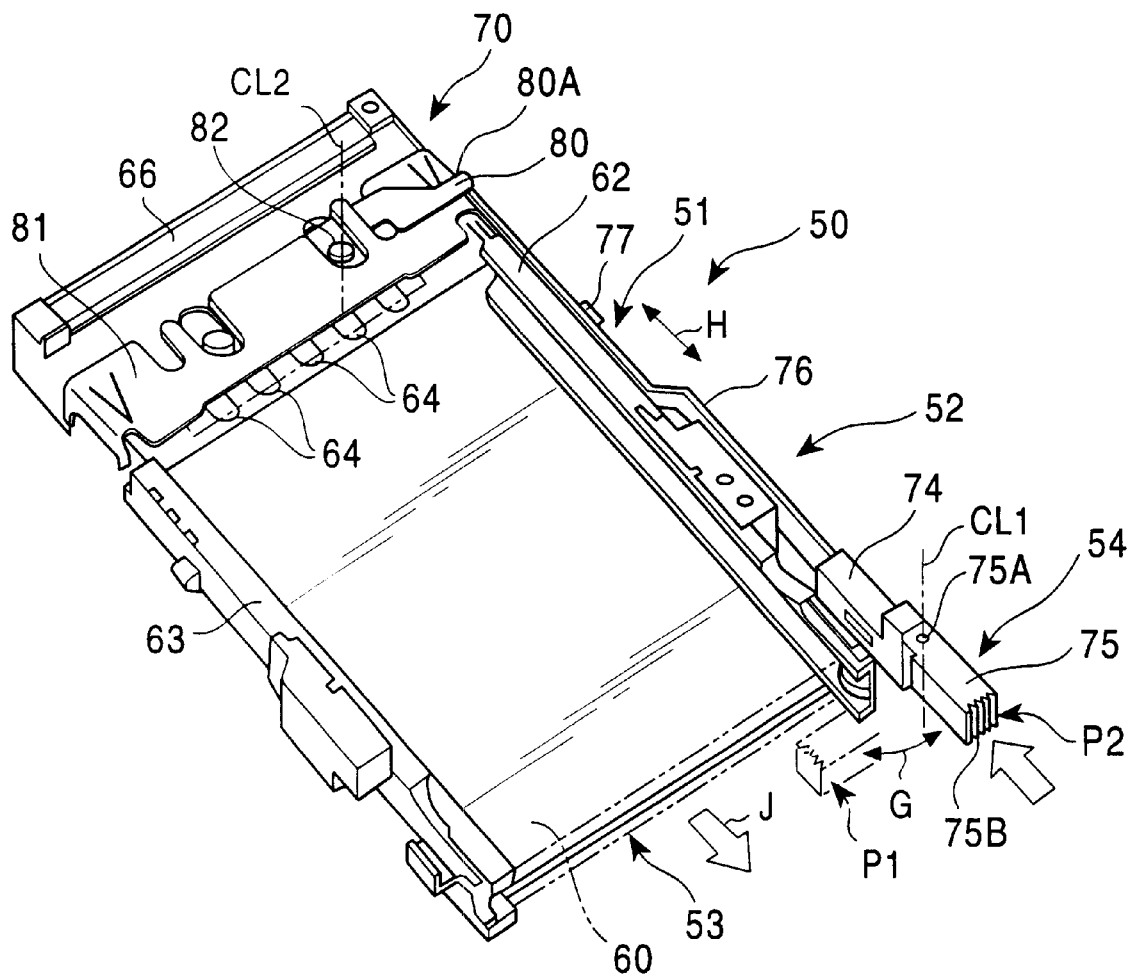
FIG. 7 is a perspective view of the mounting/demounting device as viewed from the lower side thereof.
Figure 8:
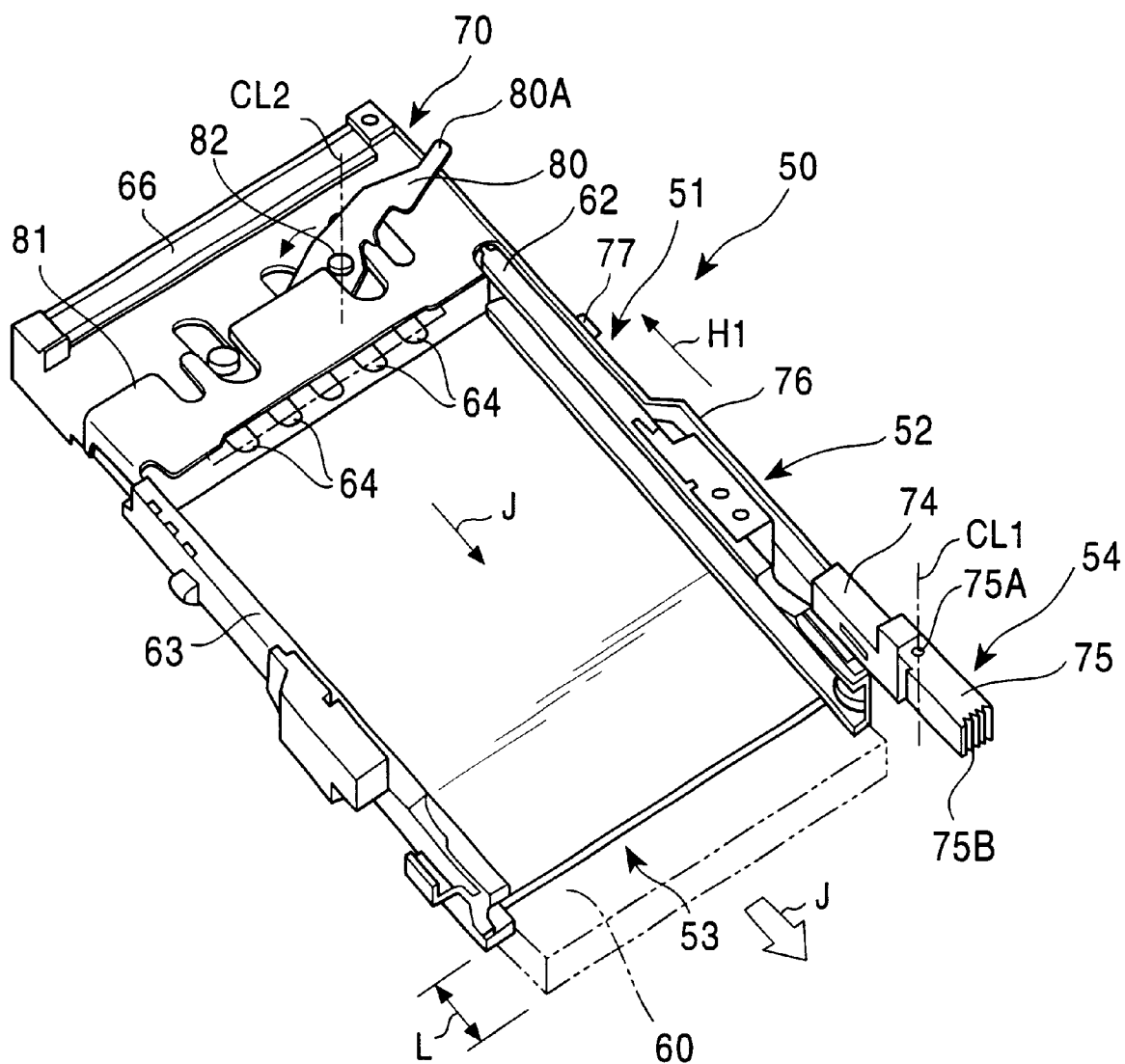
FIG. 8 is an illustration of the mounting/demounting device as viewed from the lower side thereof, showing also a card which is going to be removed.
Figure 9:
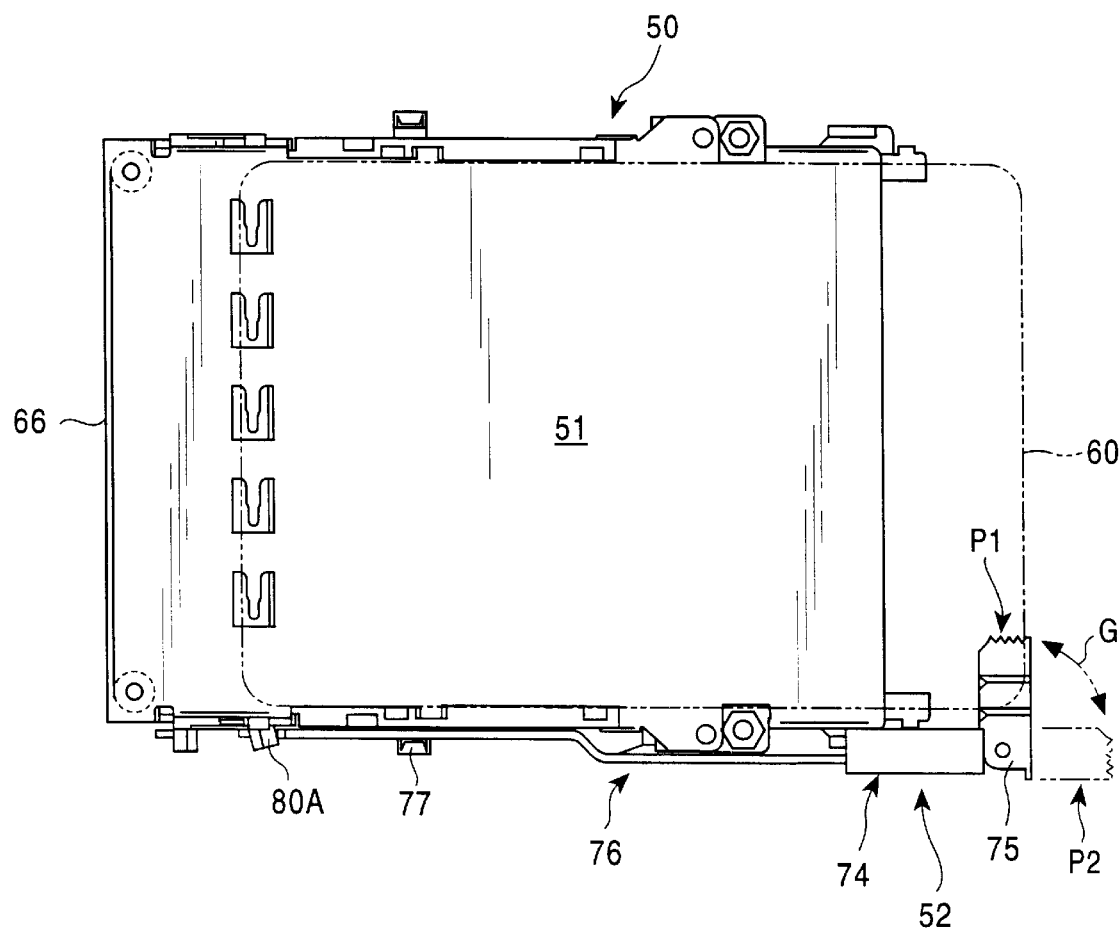
FIG. 9 is a plan view of the mounting/demounting device.
Figure 10:
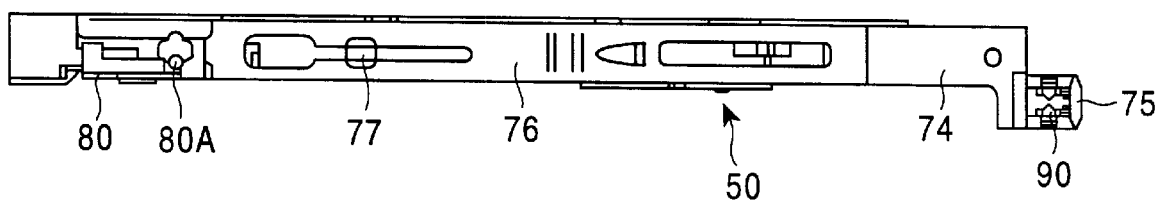
FIG. 10 is a side elevational view of the mounting/demounting device.
Figure 11:
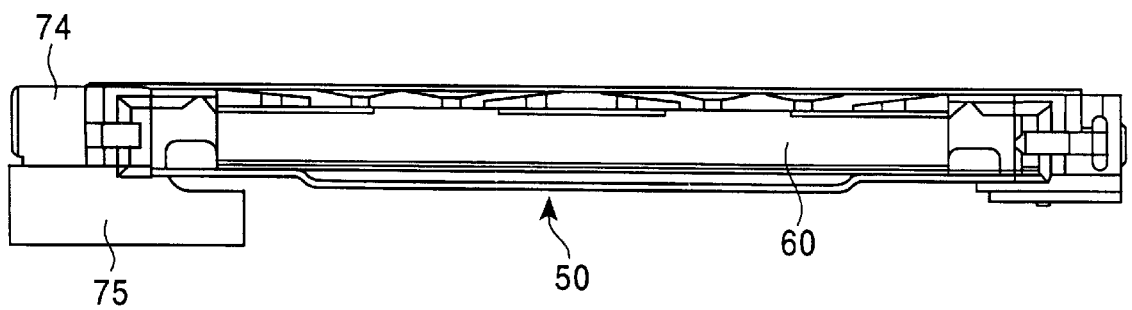
FIG. 11 is a front elevational view of the mounting/demounting device.

FIG. 7 shows the mounting/demounting device 50 as viewed from the underside thereof, with the card 60 set therein, while FIG. 8 shows the card 60 that is being withdrawn from the mounting/demounting device 50. FIGS. 9, 10 and 11 are a plan view, a side elevational view and a front elevational view, respectively, of the mounting/demounting device 50.

Referring specifically to FIGS. 4 and 9, the mounting/demounting device 50 has a supporting structure 51 and a releasing means 52. The supporting structure 51 has a slot 53 for receiving the card 60, and is adapted to support the card 60 inserted into the slot 53. The releasing means 52 has an operating portion 54 operable by a user. When the user operates the operating portion 54, the card 60 that has been supported by the supporting structure 51 is ejected out of the supporting structure 51.

A description will now be given of the construction of the supporting structure 51. Referring to FIGS. 4 and 7, the supporting structure 51 has an upper panel 601, a lower panel 61, rails 62, 63, electric connector terminals 64, and so forth. The lower panel 61 may be constituted by a portion of the main unit 2 of the portable computer 100 shown in FIG. 1 or, alternatively, a separate plate-like member may be used as the lower panel 61 exclusively for the supporting structure 51. Rails 62 and 63 are laid between the upper panel 601 and the lower panel 61 so as to extend along both longitudinal edges of these panels 601, 61, so as to slidably engage and guide both longitudinal edges 60A, 60B of the card 60. The rails 62, 63, therefore, may be constituted by elongated metallic members having a U-shaped cross-section. Either one or both of the upper and lower panels 601 and 61 may be made of a metal or plastic.

Referring to FIG. 7, the electrical connector terminals 64 are disposed adjacent a rear end member 66 of the mounting/demounting device 50. These electrical; connector terminals 64 are adapted to be electrically coupled to terminals (not shown) on the card 60 when the card 60 has been set in the supporting structure 51.

The releasing means 52 as shown in FIGS. 4 and 7 has a card thrusting portion 70 that serves to thrust the card 60, in addition to the above-mentioned operating portion 54.

As will be seen also from FIG. 9, the operating portion 54 has a base 74, a pivotable member 75, a connector rod 76 and a guide projection 77. As shown in FIG. 7, the card thrusting portion 70 has a rocker lever 80, a slider 81 and a fulcrum pin 82.

The operation of the operating portion 54 of the releasing means 52 is as follows. Referring to FIGS. 4, 5 and 7, the base 74 and the pivotable member are made of, for example, plastic. The pivotable member 75 is pivotally secured to the base 74 by means of a pin 75A so as to be pivotable about an axis CL1 from a position P1 shown by a broken line to a position P2 shown by a full line and vice versa, as indicated by double-headed arrow G. An anti-slip grooves 75B are formed on the free end surface of the pivotable member 75 so as to retain a user's finger that thrusts this member 75B.

Referring to FIG. 7, the base 74 is fixed at its distal end to the proximal end of the connecting rod 76. The connecting rod 76 is made of, for example, a metal and is slidable as indicated by the double-headed arrow H while being guided by a guide that cooperates with the guide projection 77. The sliding amount or travel of the connecting rod 76 corresponds to the amount of thrusting of the card 60 in the direction of arrow J shown in FIG. 7. As will be best seen from FIG. 7, the connecting rod 76 is connected at its rear end to one end 80A of the rocker lever 80. The arrangement is such that sliding of the connecting rod 76 in the directions of the arrow H causes the rocker lever 80 to pivot in one and the other direction about the axis CL2 of the fulcrum pin 82, as shown in FIG. 7 and 8.

When the card 60 has been set in the supporting structure 51, the rocker lever 80 of the thrusting portion 70 is held at the position shown in FIG. 7. When the connecting rod 76 is pushed in the direction of the arrow H1 in FIG. 8, the rocker lever 80 rocks counterclockwise as viewed in FIG. 8 about the axis CL2, so as to thrust the slider 81 in the direction of the arrow J, whereby the card 60 that has been set in the supporting structure 51 is pushed out of the supporting structure in the direction of the arrow J by a predetermined amount. The slider 81 and the rocker lever 80 may be made from metal sheets.

The pivotable member 75 is pivotable through about 90Q with respect to the base 74 of the operating portion 54 as indicated by the double-headed arrow G in FIG. 7. The pivotable member 75 is adapted to be restrained from swinging from the position P1, as well as from the position P2, by the effect of a spring assembly 90 shown in FIG. 10. As will be seen from FIGS. 10 and 13, the spring 90 is provided at the pivotal connection between the pivotable member 75 and the base 74.

Figure 13:
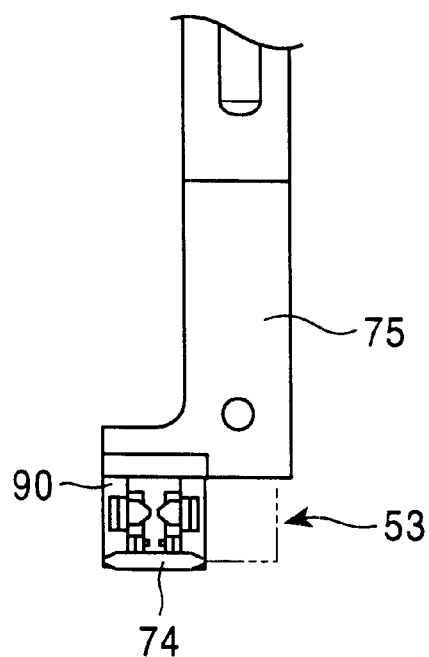
FIG. 13 is a side elevational view of the operating portion.
Figure 14:
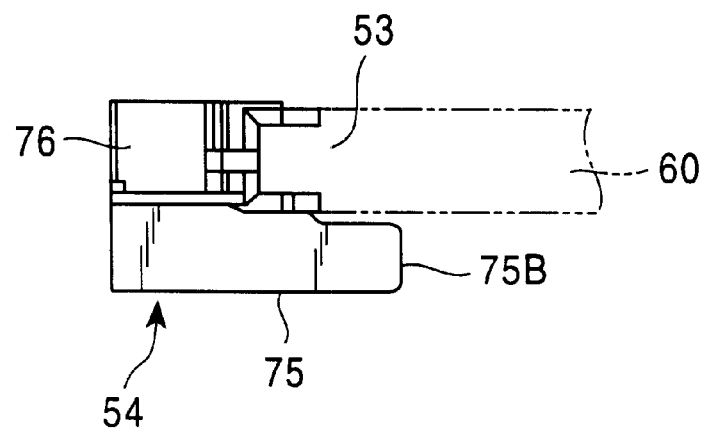
FIG. 14 is an illustration of the mounting/demounting device, showing particularly the operating portion and a card insertion slot.
Figure 15:
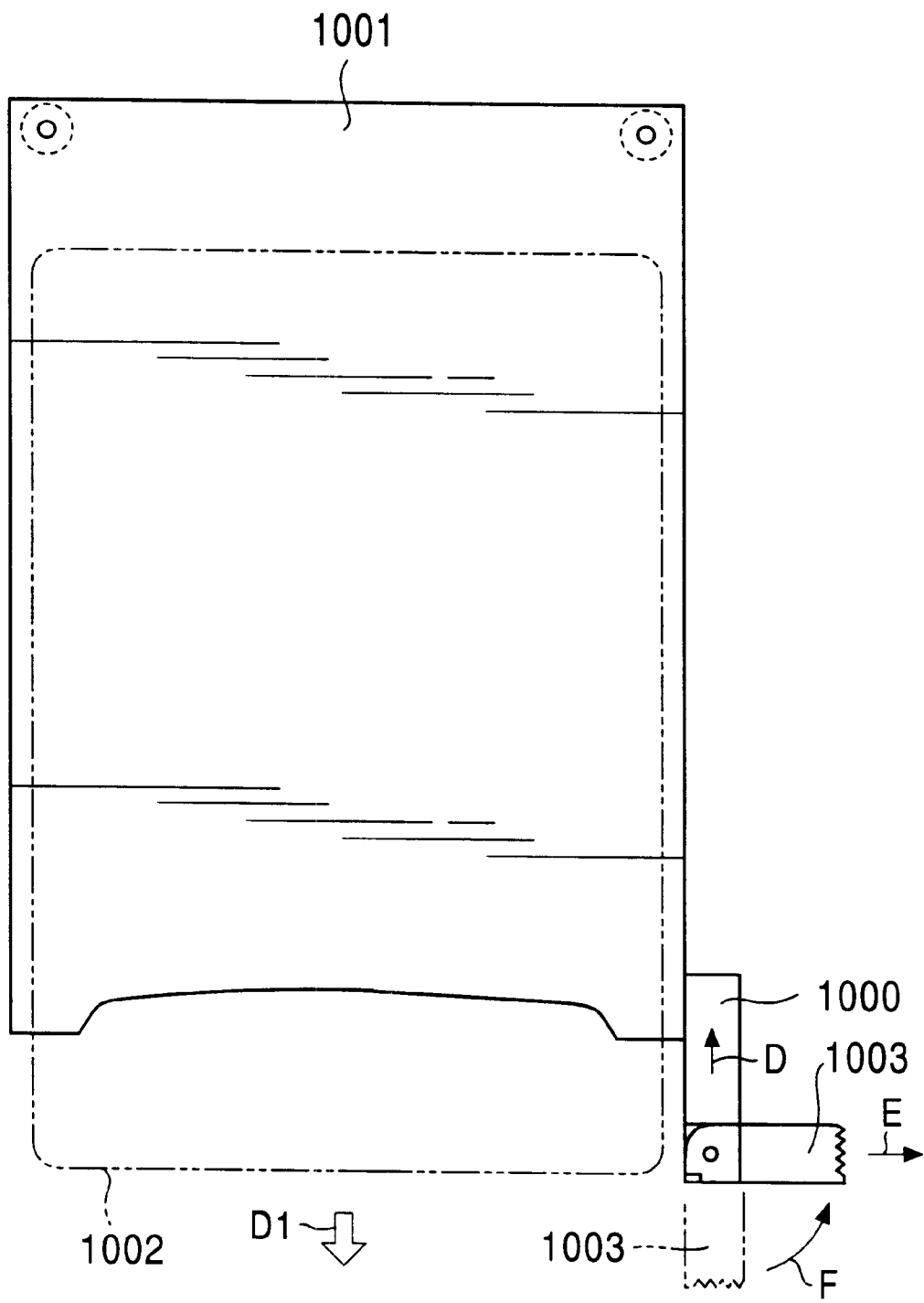
FIG. 15 is a plan view of a conventional mounting/demounting device.

As will be seen from FIGS. 13 and 14, the pivotable member 75 of the operating portion 64 is located at a position significantly offset from the slot 53 for receiving the card 60. In addition, the pivotable member 75 can pivot through 90° so as to be folded to become closer to the slot 53. The location of the pivotable member 75 and the direction of the pivotal motion of the pivotable member 75 constitute critical features of the present invention.

A description will now be given of the operation of the mounting/demounting device 50 for a card-type peripheral device, with reference to FIGS. 4 to 12.

A series of operation will be described beginning with the initial state in which the card 60 has not yet been inserted into the supporting structure 51 of the mounting/demounting device 50 as shown in FIG. 4. Then, a description will follow of the procedure for inserting the card 60 into the supporting structure and setting it in the same, and further of the procedure for taking the card 60 again from the supporting structure 51.

Referring to FIG. 4, in the initial state of the mounting/demounting device 50, the card 60 has not yet been inserted into the supporting structure 51. At the same time, the pivotable member 75 of the releasing means 52 is in the folded position close to the slot 53. However, since the pivotable member 75 is offset from the slot 53 as described before, the card 60 can be inserted into the slot 53 in this state without being interfered by the pivotable member 75.

Referring further to FIG. 4, the card 60 is inserted into the slot 53 and further pushed inward as indicated by the arrow J1, so that the card 60 progressively slides into the supporting structure 51. When the card 60 has been completely received in the supporting structure 51 as shown in FIG. 6, the electrical connector terminals 64 shown in FIG. 7 are electrically coupled to the terminals (not shown) on the card 60. Consequently, additional function implemented by the card 60, such as a MODEM function or a LAN (Local Area Network) function, is given to the portable computer 100. The card 60 is thus used on the main unit 2 of the portable computer 100.

The card 60 can then be demounted from the portable computer 100 in accordance with the following procedure.

To release the card 60 from the supporting structure 51, the user operates the releasing means 52 shown in FIG. 7.

Figure 12C:
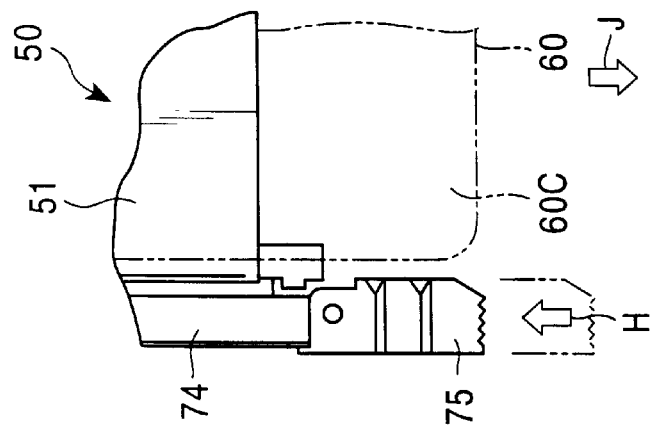
FIGS. 12A to 12C are illustrations of the mounting/demounting device, illustrative of the procedure for withdrawing a card from the mounting/demounting device, showing also a rotary part of an operating portion moved between a storage position and an operative position.
Figure 12B:
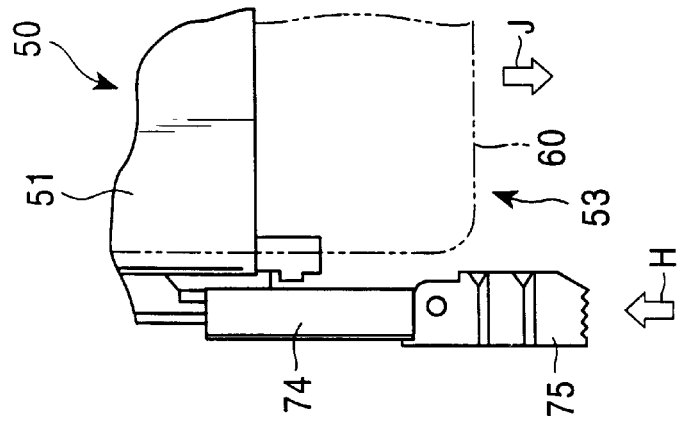
Figure 12A:
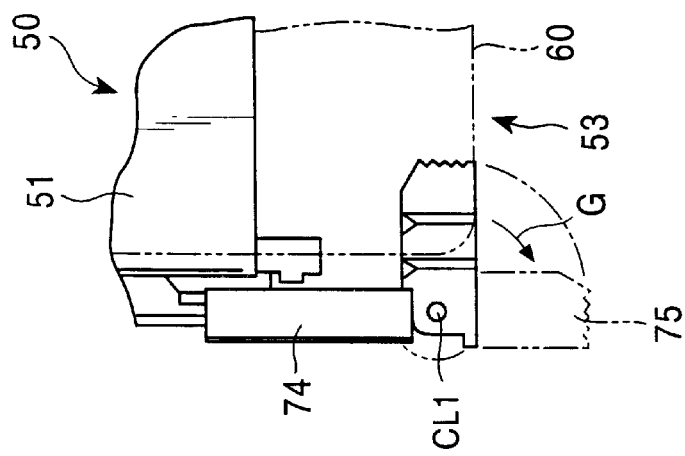

While the card 60 has been stored and locked in the supporting structure 51 as shown in FIG. 12A, the user rotates the pivotable member 75 through 90° in the direction of the arrow G, thus causing the pivotable member 75 to project. Then, the user pushes the pivotable member 75 in the direction of the arrow H as shown in FIG. 12B, thereby ejecting the card. Consequently, the card 60 progressively moves outward from the supporting structure 51, as indicated by the arrow J.

When the pivotable member 75 serving as a push button has been fully pressed inward in the direction of the arrow H as shown in FIG. 12C, the end 60C of the card 60 emerges from the supporting structure 51 so as to be pinched by user's fingers. The user therefore an easily extract the card 60 out of the supporting structure.

The user, after extracting the card 60, operates the pivotable member 75 so as to cause the same to pivot counterclockwise about the axis CL1 through 90°, whereby the pivotable member 75 is reset to the position lying aside the slot 53, i.e., to the position shown in FIG. 12A or FIG. 4.

Thus, the pivotable member 75 can be folded to lie aside the slot 53 and stored in this position both in the state in which the card 60 is completely received and locked in the supporting structure and in the state in which the card 60 has been extracted and separated from the supporting structure 51. With this arrangement, therefore, the space occupied by the mounting/demounting device 50 is significantly reduced as compared with the conventional arrangement in which the pivotable portion is folded outward, i.e., away from the slot 53. Consequently, the mounting/demounting device 50 can contribute to reduction in the overall dimensions of the main unit 2 shown in FIG. 1.

Although the invention has been described through its preferred form, it is to be understood that the described embodiment is only illustrative.

For instance, while a standardized PC card has been specifically mentioned as an example of the card, it is to be appreciated that the present invention can be carried out with various kinds of cards including not only storage devices such as a flash memory or a hard disk but also other functional cards that implement functions such MODEM and LAN functions. The present invention does not restrict the thickness of the card. Thus, various types of cards that are now available can be used. Anyway, the dimensions of the mounting/demounting device may be determined in accordance with the types and sizes of the cards to be used.

It is also to be understood that the electronic apparatus in accordance with the present invention is not limited to a portable computer as described but also may be implemented in a variety of forms such as mobile information terminals and desk-top computers, as well as electronic apparatuses of various other fields.

As will be understood from the foregoing description, the present invention provides a mounting/demounting device for a card-type peripheral device, which occupies a smaller space than that required by conventional arrangements.

What is claimed is:

1. A mounting/demounting device for mounting and demounting a card-type peripheral device to a main electronic unit that enhances or adds to functions thereto, comprising:

a supporting structure having a slot on a side wall thereof for receiving and supporting said card-type peripheral device and wherein said card-type peripheral device is inserted into the slot in an insertion direction; and releasing means having an operating portion formed on the side wall of said supporting structure having said slot with said operating portion having a base and a pivotable member pivotally secured to the base, said pivotable member being located at a position offset from and below said slot, said pivotable member of said operating portion being selectively pivotable at a position beneath said slot and movable between a first position, wherein said pivotable member is in a folded condition close to but offset from said slot of said supporting structure to permit said card-type peripheral device to be inserted into said slot, and a second position, wherein said pivotable member is pivoted such that the pivotable member is depressed in a direction coaxial with the insertion direction to thereby engage ejection means of said releasing means to eject the card-type peripheral device from the slot.

2. The mounting/demounting device according to claim 1, wherein said pivotable member is pivotable towards said slot to place said operating portion in said first position and to position said pivotable member adjacent and below said slot.

3. The mounting/demounting device according to claim 1, wherein a force imparted on said operating portion when said operating portion is in said second position causes said card-type peripheral device to be ejected out of said supporting structure.

4. An electronic apparatus, including:
a mounting/demounting device for mounting and demounting a card-type peripheral device to a main electronic unit that enhances or adds to functions thereto, said mounting/demounting device comprising:
a supporting structure having a slot on a side wall thereof for receiving and supporting said card-type peripheral device and wherein said card-type peripheral device is inserted into the slot in an insertion direction; and
releasing means having an operating portion formed on the side wall of said supporting structure having said slot with said operating portion having a base and a pivotable member pivotally secured to the base, said pivotable member being located at a position offset from and below said slot, said pivotable member of said operating portion being selectively pivotable at a position beneath said slot and movable between a first position, wherein said pivotable member is in a folded condition close to but offset from said slot of said supporting structure to permit said card-type peripheral device to be inserted into said slot, and a second position, wherein said pivotable member is pivoted such that the pivotable member is depressed in a direction coaxial with the insertion direction to thereby engage ejection means of said releasing means to eject the card-type peripheral device from the slot.

5. A mounting/demounting device for mounting and demounting a card-type peripheral device to a main electronic unit that enhances or adds to functions thereto, comprising:
a supporting structure having a slot on a side wall thereof for receiving and supporting said card-type peripheral device and wherein said card-type peripheral device is inserted into the slot in an insertion direction;
releasing means having an operating portion formed on the side wall of said supporting structure having said slot with said operating portion having a base and a pivotable member pivotally secured to the base, said pivotable member being located at a position offset from said slot, said pivotable member of said operating portion being selectively movable between a first position, wherein said pivotable member is in a folded condition close to but offset from said slot of said supporting structure to permit said card-type peripheral device to be inserted into said slot, and a second position, wherein said pivotable member is pivoted such that the pivotable member is depressed in a direction coaxial with the insertion direction to thereby engage ejection means of said releasing means to eject the card-type peripheral device from the slot; and
wherein said pivotable member is pivotable towards said slot to place said operating portion in said first position and to position said pivotable member adjacent and below said slot.

* * * * *